(12) United States Patent
Renton et al.

(10) Patent No.: US 7,188,704 B2
(45) Date of Patent: *Mar. 13, 2007

(54) ENERGY ABSORBER

(75) Inventors: Julian E. Renton, Bradford on Avon (GB); Peter Nott, Devizes (GB)

(73) Assignee: Keyguard Limited, Wiltshire (GB)

( * ) Notice: Subject to any disclaimer, the term of this patent is extended or adjusted under 35 U.S.C. 154(b) by 132 days.

This patent is subject to a terminal disclaimer.

(21) Appl. No.: 11/155,234

(22) Filed: Jun. 17, 2005

(65) Prior Publication Data

US 2005/0252718 A1    Nov. 17, 2005

Related U.S. Application Data

(62) Division of application No. 10/168,259, filed as application No. PCT/GB00/04839 on Dec. 15, 2000, now Pat. No. 6,918,464.

(30) Foreign Application Priority Data

Dec. 21, 1999  (GB) ................... 9930232.5
Mar. 3, 2000   (GB) ................... 0005252.2
Nov. 13, 2000  (GB) ................... 0027665.9

(51) Int. Cl.
*E06C 5/34* (2006.01)

(52) U.S. Cl. ................. 182/18; 182/7; 188/83

(58) Field of Classification Search ............. 182/18, 182/3, 5, 6, 7, 231, 236; 248/613; 267/71; 188/80, 83, 166
See application file for complete search history.

(56) References Cited

U.S. PATENT DOCUMENTS

| 3,087,584 A | 4/1963 | Jackson et al. |
| 3,561,690 A | 2/1971 | Muskat |
| 3,743,267 A | 7/1973 | Guerster et al. |
| 4,258,934 A | 3/1981 | Tsuge et al. |
| 4,358,136 A | 11/1982 | Tsuge et al. |
| 4,877,110 A | 10/1989 | Wolner |
| 4,978,139 A | 12/1990 | Andres et al. |
| 5,131,470 A | 7/1992 | Miszewski et al. |
| 5,361,867 A | 11/1994 | Olson et al. |
| 5,720,496 A | 2/1998 | Riefe et al. |
| 5,771,993 A | 6/1998 | Anderson et al. |
| 5,829,548 A | 11/1998 | Ostrobrod |
| 2003/0151180 A1 | 8/2003 | Renton |

FOREIGN PATENT DOCUMENTS

| EP | 0 252 031 A1 | 1/1988 |
| EP | 0 949 136 A1 | 10/1999 |
| GB | 849650 | 9/1960 |

(Continued)

*Primary Examiner*—Hugh B. Thompson, II
(74) *Attorney, Agent, or Firm*—Brooks Kushman P.C.

(57) ABSTRACT

An energy absorber comprises a housing (1), a store (15) of plastically deformable material (8) mounted in the housing and having an endstop (27), an attachment (3) for attaching the energy absorber to a structure, another attachment (10) for attaching the plastically deformable material (8) to a structure, and the housing mounting a pair of spaced pins (5, 6) around which the deformable material (8) from a coil is plastically deformed in different directions in a sequential manner to absorb energy. A pair of pins (7, 33) or a guide element (51) and a pin (33) are contacted by the endstop (27) to limit the plastic deformation.

16 Claims, 12 Drawing Sheets

FOREIGN PATENT DOCUMENTS

| | | |
|---|---|---|
| GB | 964095 | 7/1964 |
| GB | 964096 | 7/1964 |
| GB | 1020556 | 2/1966 |
| GB | 1043670 | 9/1966 |
| GB | 1060974 | 3/1967 |
| GB | 1186332 | 4/1970 |
| GB | 1237224 | 6/1971 |
| GB | 1601809 | 11/1981 |
| GB | 2101705 | 1/1983 |
| GB | 2244305 | 11/1991 |
| WO | WO 95/29738 | 11/1995 |
| WO | WO 95/32759 | 12/1995 |
| WO | WO 97/37876 | 10/1997 |

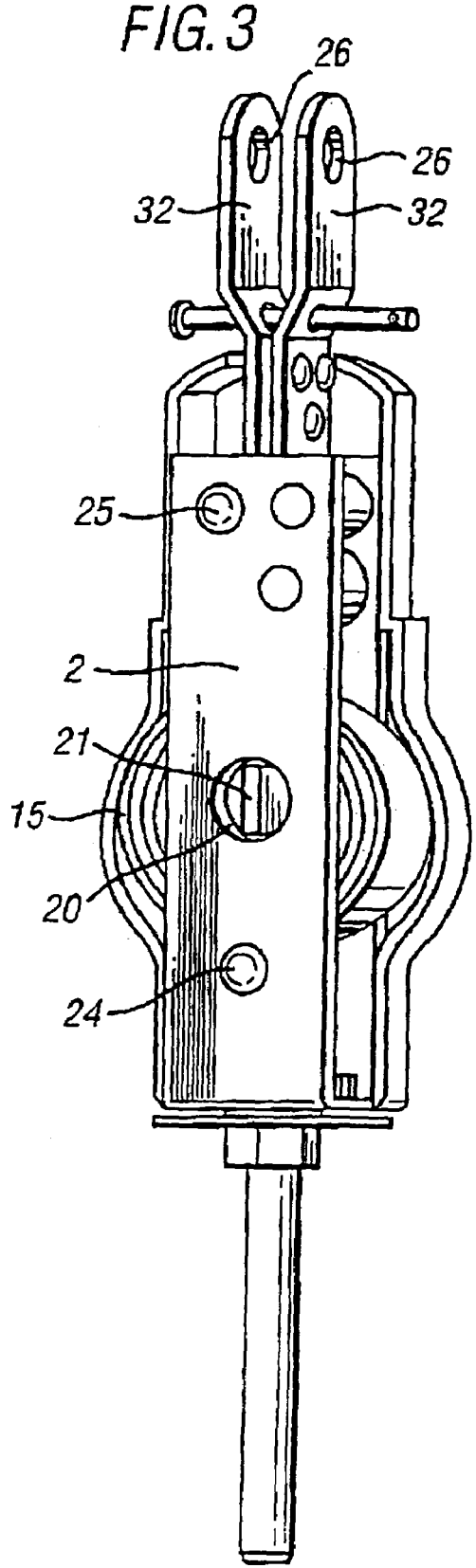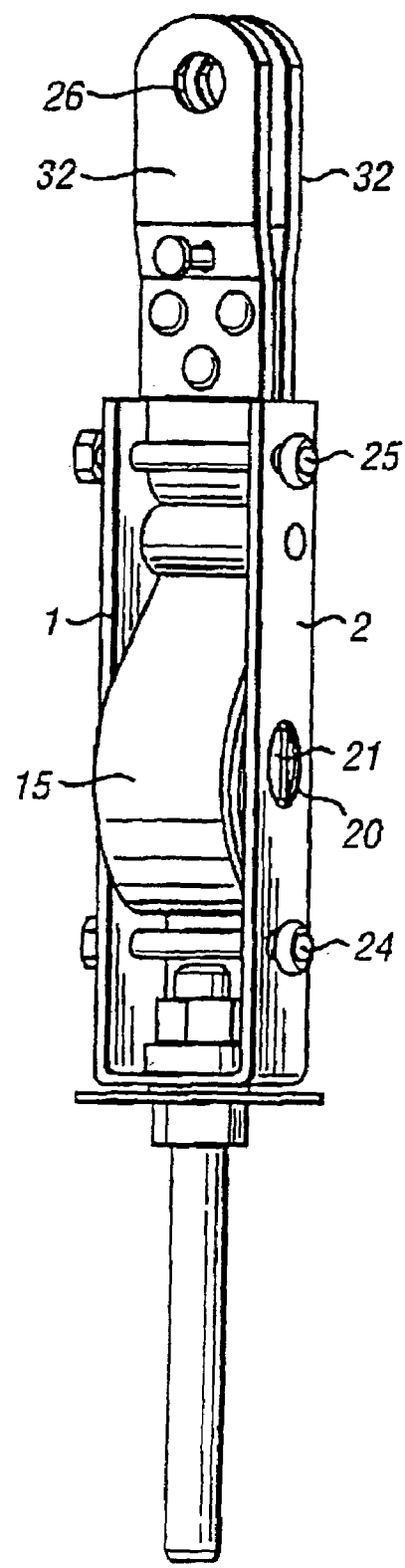

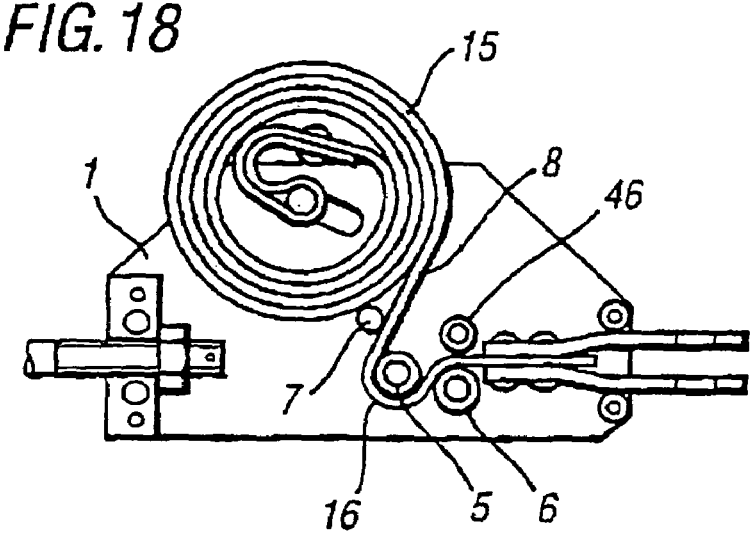
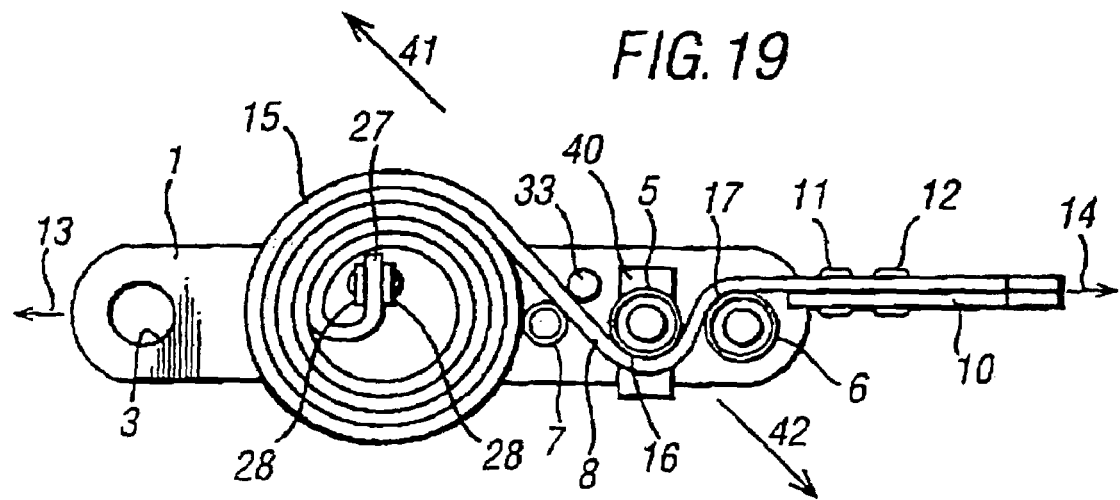

ENERGY ABSORBER

CROSS-REFERENCE TO RELATED APPLICATIONS

This application is a divisional of application Ser. No. 10/168,259 submitted on Jun. 19, 2002 by Julian E. Renton and Peter Nott with the title ENERGY ABSORBER under 35 U.S.C. 371 from Patent Cooperation Treaty Application PCT/GB00/04839 which was filed on Dec. 15, 2000, now U.S. Pat. No. 6,918,464.

BACKGROUND OF THE INVENTION

1. Field of the Invention

The present invention relates to an energy absorber and, in particular, to an energy absorber that absorbs tensile energy and deploys irreversibly at or close to a constant force.

2. Background Art

Tension energy shock absorbers are often used to assist the absorption of energy in constrained or partially constrained lines. For example, fall arrest applications require energy from a falling body to be absorbed by a line such as a rope or wire which is usually attached to a strong structure at one end or both ends. In such situations, it is desirable to achieve a low combination of stretch in the line and line tension. Lowering line stretch reduces the distance the body falls before arrest, and also reduces the fall energy. Lowering line tension reduces the loading on the line and also on the anchor or anchors constraining the line. Another example of energy absorption in constrained lines is vehicle crash barriers that absorb vehicle kinetic energy. Lower line stretch reduces the degree to which a vehicle can move across a crash barrier. Lower line loads reduce the likelihood of line and/or anchorage failure in the event of a crash.

The amount of energy absorption in constrained or partially constrained lines is determined by the product of stretch in the line and the line tension. Typically, line stretch is elastic such that the amount of stretch increases in proportion to the tension in the line. The energy absorbed is therefore the average line tension or half the maximum line tension multiplied by the stretch. However, in order to minimise the combination of line stretch and line tension, the ideal line system would absorb energy by stretching at a predetermined line tension where the energy absorbed is the predetermined line tension multiplied by the line stretch. This would absorb the same energy as the elastic line system for a given maximum line tension but require only half the line stretch. Also, such a system would be able to limit maximum line tension to the predetermined force at which stretch occurs.

In practice, it is difficult to achieve this ideal, but significant improvement can be made in energy absorption efficiency with respect to the combination of line stretch and line tension by combining low stretch line with an energy absorber that deploys by stretching at a predetermined force. If the extent of deployment stretch in such an absorber is sufficiently large, it could also effectively limit line tension to the predetermined deployment force for all foreseeable energy absorption situations. This is important for establishing with a high degree of certainty safe design criteria for line systems and anchors.

In energy absorbers for use in fall arrest systems it is a normal requirement that the energy absorber be able to support double the peak deployment force after full deployment.

In conventional energy absorbers that deploy at a constant force, the component which is deployed is typically straight, being housed within a further straight component prior to deployment. The overall length of such an absorber prior to deployment is therefore greater than the extent of deployment. Such energy absorbers typically consist of a component, preferably having a spherical or part-spherical leading portion, which is pulled through a length of tube having a bore smaller in diameter than the outer dimension of the leading portion of said component, such that a force is required effectively to extrude the bore of the tube. One such energy absorber is described in the present Applicants granted European Patent No. EP 0 605 538.

In view of the foregoing analysis, it will be clear to persons skilled in the art that, in applications in which large deployment extents are required, the overall length of the energy absorber also needs to be large.

This is undesirable, not only from the point of view of cost, but also because in many applications such as fall arrest it is important to gain access to a constrained or partially constrained line close to the constraining anchors. Typically, large deployment extents are useful for containing line loads and also ensuring that line loads never exceed the predetermined deployment force of the energy absorber for all foreseeable situations, and provide a useful energy absorption surplus as a contingency against unforeseeable circumstances.

SUMMARY OF THE INVENTION

An object of the present invention to provide an energy absorber which gives a long deployment stroke without occupying an inordinate linear extent.

According to the present invention, there is provided an energy absorber comprising housing means, a store of plastically deformable material wound in a coil and having an endstop at one end and mounted in said housing means, means for attaching the energy absorber to a first structure, means for attaching the plastically deformable material to a second structure, and means responsive to a predetermined tensile load between the first and second structures effective to deploy said plastically deformable material in a controlled manner from its store whereby said material is permanently plastically deformed during said deployment, thereby absorbing energy, the energy absorber being able to support a load at least twice the predetermined tensile load when further deployment of said material is prevented by the endstop.

Preferably, the plastically deformable material is a length of yielding material such as metal, the length being relative to the maximum extension required for absorbing energy. One end of the length of material preferably has provision for attaching the material to a line or rail anchorage and, close to such attachment provision, the material is preferably constrained in a non-linear path by a structure that also has provision for attachment to a line or anchorage. In such an arrangement, when the material is pulled relative to the structure, the material is forced by the structure to move in a non-linear path and its movement is therefore resisted primarily by the reluctance of the material to yield. Movement of the material is enabled when the pulling force is sufficiently great to overcome the yielding resistance, thus having the effect of absorbing energy as a result of the product of the tensile force needed to overcome the resistance to movement of the material and the extent of movement of the material relative to the structure. The tensile forces required to effect deployment are substantially determined by the yielding and therefore plastic deformation properties of the material, its section shape and the degree of non-linearity of its path as constrained by the housing means.

The length of material can have any cross-section such as rectilinear, round, tubular or any other shape. In some embodiments, the section shape can vary along the length of the material, for example, in applications in which it is desirable to vary the resistant force between the housing means and the material. The non-linear path of the material when pulled and as constrained by the housing means is defined by two dimensional inclinations.

Preferably, the elements of the housing means constraining the path of movement of the material when pulled relative to the housing means can be circular shafts or rollers, each roller rotating about its own axis, or any other shape constraining the path of the material.

BRIEF DESCRIPTION OF THE DRAWINGS

The invention will now be described by way of example only with reference to the drawings, in which:

FIG. 3 shows a first perspective view of a second embodiment;

FIG. 4 shows a second perspective view of the embodiment of FIG. 3;

FIG. 18 shows a side view of an eighth embodiment ready for deployment;

FIG. 19 shows a side view of another embodiment of the invention ready for deployment;

DETAILED DESCRIPTION OF THE PREFERRED EMBODIMENTS

Figure 1:
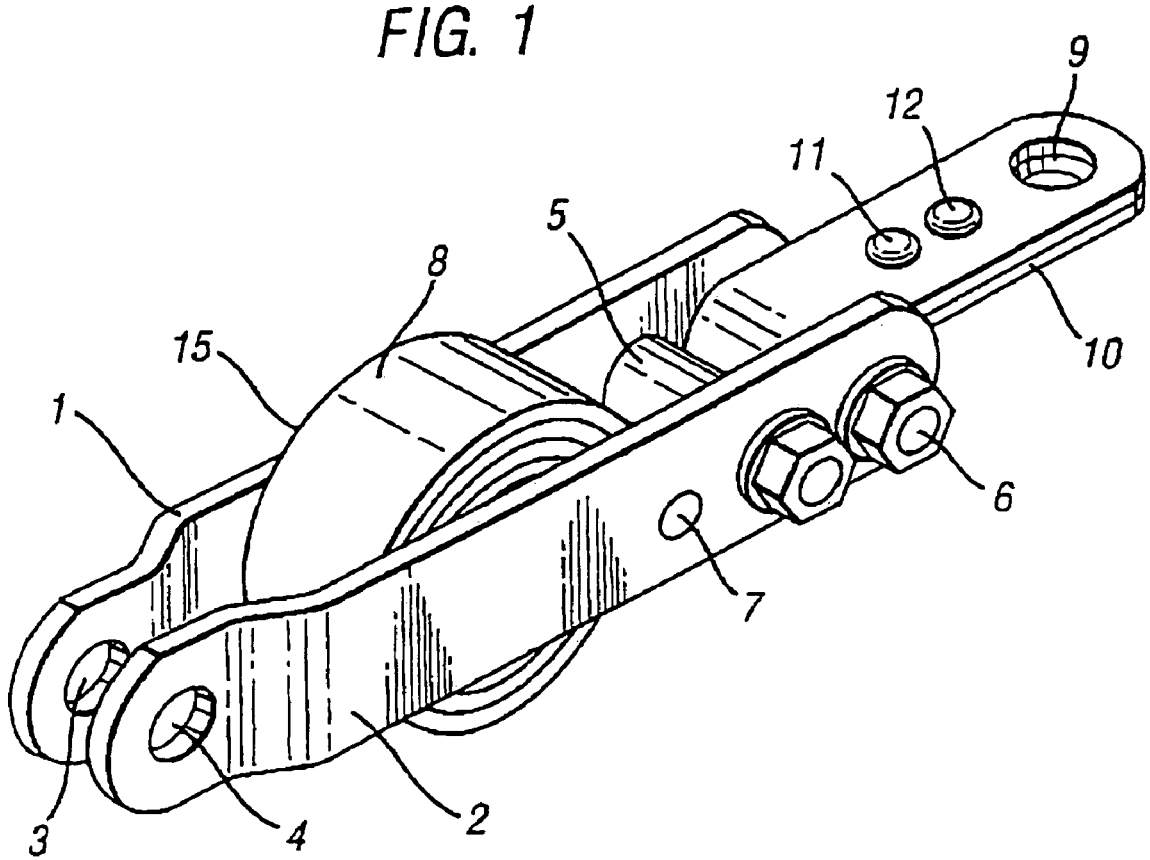
FIG. 1 is a perspective view of a first embodiment with the length of material spirally wound.
Figure 2:
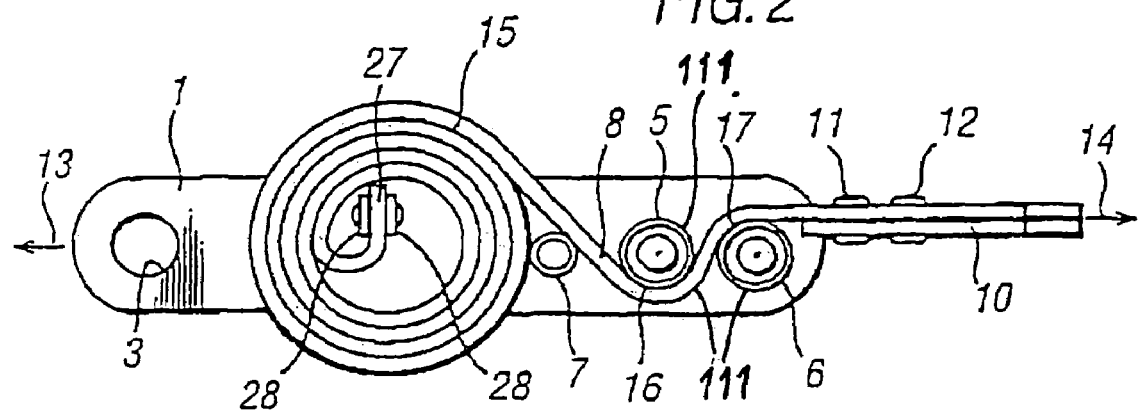
FIG. 2 shows a side elevation of the embodiment depicted in FIG. 1.

As shown in FIGS. 1 and 2, an energy absorber has a structure comprising a housing means formed of plates 1 and 2 that are spaced apart and fixed to pins 5, 6 and 7 such that plates 1 and 2 are rigidly linked. Fixing means 3 and 4 are provided at one end of the plates for attaching them to a rigid anchor or wire or rope termination. Length of material 8 is a strip material that is wound into a spiral 15 and bent at 16 and 17 to fit beneath pin 5 and above pin 6, respectively. The length of material 8 is provided with attachment means 9 at one end for attaching to a rigid anchor or wire or rope termination and with an endstop 27 at the other end to prevent the material 8 being separated from the housing. The spiral winding enables a long length of material to be stored within a relatively short linear space. Plate 10 is held to the end of length of material 8 by means of rivets 11 and 12 in order strengthen attachment means 9. In some embodiments not illustrated here, it may not be necessary to include plate 10. Alternatively, plate 10 could be fixed to the end of length of material 8 by some other means, such as by welding.

When the energy absorber is required to absorb energy, an increasing tension force is applied to attachment means 3 and 4, and 9 in the direction of arrows 13 and 14 until the applied force becomes sufficiently high to pull material 8 around pins 5 and 6 such that the absorber extends to absorb energy. Pin 7 assists in unwinding spiral 15.

In order to allow the tension force required to deploy the material 8 and so extend the absorber to be kept constant the degree of bending of the material 8 at bends 16 and 17 around pins 5 and 6 must be kept constant. The location of the pin 7 controls the angle at which the material 8 is supplied to 5 the pin to be fixed as the material 8 deploys from the spiral 15 and so keeps the tension force constant.

The endstop 27 is formed by additional plates 28 of material rivetted to the faces of the material 8 close to the end of material 8 to provide a thickened section which becomes trapped between pins 5 and 6 to provide a limit to the deployment of material 8. The endstop 27 is relatively substantial in order to allow the endstop 27 to retain the material 8 attached to the housing, and thus to the support structure through fixing means 3 and 4, under a load of at least double the deployment tension force after full deployment of the material 8.

If material 8 is consistent in nature and cross-section, the tension force required to move the material in the direction of arrow 14 should be approximately constant in relation to the degree of movement of material 8.

The energy absorption as the absorber extends is produced by the unwinding of the material from the spiral and by the bending and subsequent straightening of the length of material 8 around the pins 5 and 6.

It might be expected that the tension force would increase as the material 8 unwinds from the spiral 15 because the curl diameter of the spiral decreases as the material 8 is deployed resulting in a greater degree of bending of the material 8 being required. However, in practice no such increase in the tension force has been observed. It is believed that this is because the degree of bending required to straighten material from the spiral is very much smaller than the degree of bending and re-bending taking place around the pins 5 and 6 at the bends 16 and 17 so that any increase in the tension force is marginal. Nevertheless, it is still expected that such an increase in tension force as the material 8 is deployed will occur, particularly where the degree of bending at the bends 16 and 17 is relatively small and the coil 15 has a relatively small radius.

When the energy absorber is intended for use in a fall arrest system the energy absorber will normally be dimensioned so that the energy absorbed by deploying the material 8 fully until the endstop 27 becomes trapped between the pins 5 and 6 is significantly greater than the maximum amount of energy which is expected to require absorption in a fall arrest event. Thus, in order to avoid excessive line tension and physical shock to users, where the energy absorber is to be used in a fall arrest system it would normally be expected that the fall would be arrested and deployment of the material 8 stopped before the endstop 27 was reached. However, the endstop 27 is a safety feature preventing release of the material 8 from the housing even if the energy absorption requirements in the fall arrest situation prove to be greater than expected. Further, the endstop 27 provides a positive limit on extension of the material 8 from the housing so that the requirement that after full deployment the energy absorber still be able to support twice the peak tension force encountered during deployment can be met.

It should be noted that the provision of such endstops is not normal in energy absorbers.

One potential source of undesirable variation in the tension force as the material 8 deployed from the energy absorber shown in FIGS. 1 and 2 is that the tension in the material 8 as it deploys will tend to pull the coil 15 towards the pin 7, resulting in a varying frictional load, and possibly resulting in the coil 15 riding over the pin 7. Such overriding of the pin 7 by the coil 15 would significantly change the geometry of the system and could result in significant changes in the load.

A second alternative embodiment of the invention is shown in perspective in FIGS. 3 and 4.

The second embodiment shown in FIGS. 3 and 4 is similar to the first embodiment shown in FIGS. 1 and 2 except that an aperture 20 is formed in the side plate 2. A matching aperture 20 is also formed in the side plate 1, but this is not visible in the figures.

The endstop 27 of the material 8 is formed into a T-shape so that a lateral extension 21 of the material 8 extends into the aperture 20. A corresponding lateral extension 21 in the opposite direction extends into the aperture 20 formed in the opposite side plate 1, but again this is not visible in the figures.

The apertures 20 are sized so that the projections 21 fit loosely within the apertures 20 allowing the spiral 15 of material 8 to rotate freely as the material 8 is deployed from the housing. The loose fit of the projections 21 within the apertures 20 constrains the movement of the spiral 15 sufficiently to prevent the spiral 15 overriding the pin 7 but allows the position of the spiral 15 to float to compensate for changes in the radius of the coil 15 as the material 8 deploys.

This floating movement of the coil 15 allows the point at which the outermost layer of the material 8 is detached from the bulk of the coil 15 to remain approximately fixed relative to the position of the pin 7 throughout the deployment of the material 8. This helps to keep the degree of bending experienced by the material 8 close to constant throughout the deployment so that the tension force remains as close as possible to a constant value.

The projections 21 at the end of the material 8 passing into the apertures 20 also provides an endstop for the material 8. When the material 8 is fully deployed further movement of the material 8 out of the housing 1 is stopped by engagement of the projections 21 in the apertures 20. However, in this arrangement it will normally be preferred for safety reasons to also provide a back-up endstop 27 similar to that shown in the first embodiment of FIGS. 1 and 2.

Although the second embodiment shown in FIGS. 3 and 4 is generally effective, there are disadvantages to the use of projections at the end of the material 8 passing into apertures in the housing side plates.

The first disadvantage of the use of projections at the end of the material 8 passing into apertures is that contact between the projections and the sides of the apertures as the material 8 deploys and the spiral coil rotates can generate significant amounts of friction. As will be explained in more detail below frictional forces acting on the material 8 are generally undesirable. Friction generated by contact between the projections and the sides of the apertures is particularly undesirable because due to the rotation of the spiral coil the contact and resulting amount of frictional force is intermittent and unpredictable and will inevitably produce variations in the deployment force of the material 8.

A further disadvantage of the use of projections passing into apertures in the side plates is cost. Such an arrangement is relatively costly to manufacture compared to the other embodiments described herein.

However, despite these disadvantages the second embodiment can usefully be employed.

In the second embodiment the housing structure is different from the first embodiment. In the second embodiment the housing is formed by side plates 1 and 2 which are formed by bending a single plate into a U-shape such that the side plates 1 and 2 and one end of the housing are an integral unit. In addition to the pins 5, 6 and 7 which interact with the material 8, additional structural pins 24 and 25 are provided to ensure that the side plates 1 and 2 are rigidly linked and the housing provides a rigid structure but these pins 24 and 25 do not cooperate with the deployed material 8.

The pins 24 and 25 project beyond the side plates 1 and 2 to secure an exterior casing (not shown in FIG. 4) to the housing.

Further, instead of fixing means 3 and 4 in the first embodiment the housing of the second embodiment is fixed to a rigid anchor or wire rope termination by the anchor or a rope being passed through an aperture in the end of the U-shape forming the housing structure.

Further, in the second embodiment an alternative termination means 26 for the end of the material 8 for attaching to a rigid anchor or wire rope termination is shown. A pair of plates 32 are held to the end of a length of material 8 by means of rivets and the attachment means 26 are provided as holes through the opposed plates 32.

Figure 5:
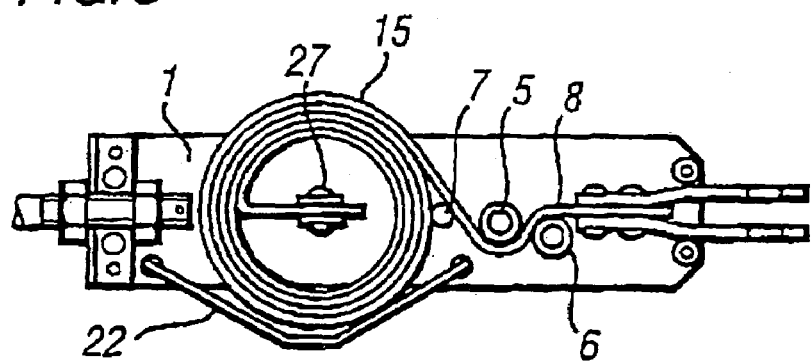
FIG. 5 shows a side elevation of the third embodiment ready for deployment.
Figure 6:
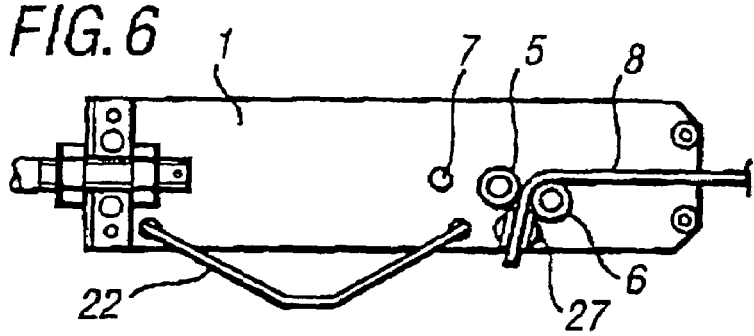
FIG. 6 shows a side view of the embodiment of FIG. 5 after deployment.

A third embodiment of the invention is shown in FIGS. 5 and 6 which both show side views of a third embodiment of the energy absorber. In FIG. 5 the energy absorber is shown before operation, that is, in an un-deployed condition while in FIG. 6 the energy absorber is shown after full deployment with the material 8 fully extended from the housing.

The energy absorber according to the third embodiment is similar to the absorber of the first embodiment having side plates 1 and 2 without the aperture 20 provided in the absorber of the second embodiment.

A U-shaped plate 22 is located between the side plates 1 and 2 adjacent the rest position of the coil 15.

When the material 8 is deployed from the absorber the tension in the material 8 will tend to pull the coil 15 towards and over the pin 7. Such a movement of the coil 15 will be prevented by the side plate 22. As the material 8 deploys from the coil 15 the body of the coil 15 will be urged into contact with the pin 7 and the side plate 22 to prevent the coil 15 overriding the pin 7.

It is preferred for the endstop 27 to be able to pass between the pin 7, pin 5 and side plate 22 and to be held between the pins 5 and 6 to provide its endstop action.

Figure 7:
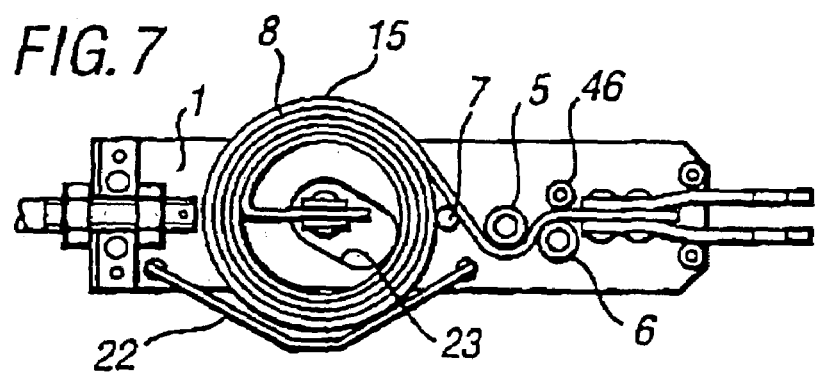
FIG. 7 shows a side view of a fourth embodiment ready for deployment.
Figure 8:
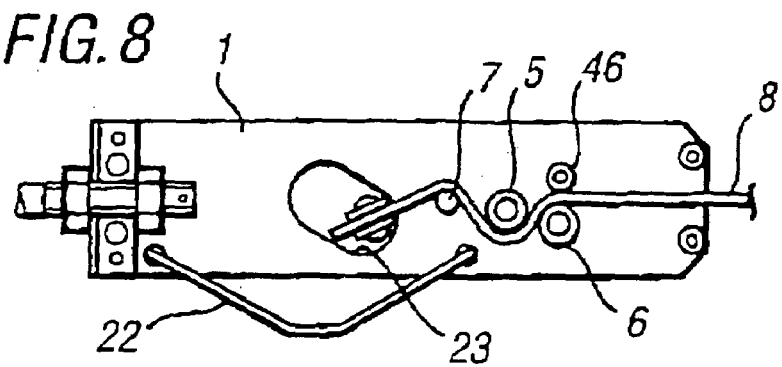
FIG. 8 shows a side view of the embodiment of FIG. 7 after deployment.

A fourth embodiment of the invention is shown in FIGS. 7 and 8 which again show side elevation views of the absorber with FIG. 7 showing the absorber when the material 8 is un-deployed and FIG. 8 showing the absorber when the material 8 is fully deployed.

Figure 9:
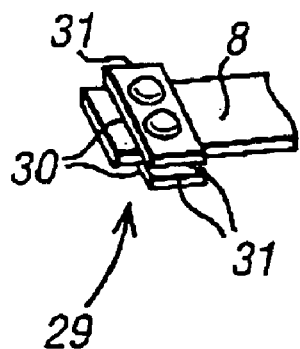
FIG. 9 shows an endstop structure suitable for use in the embodiment of FIG. 7.

The endstop arrangement of the fourth embodiment is shown in detail in FIG. 9.

In the fourth embodiment the housing includes a substantially U-shaped side plate 22 similar to that shown in the third embodiment and having the same function of preventing the spiral 15 overriding the pin 7 and cooperating with the pin 7 to control the position of the spiral 15 as the material 8 is deployed.

In the fourth embodiment there are apertures 23 in the side plates 1 and 2 (only the aperture 23 and side plate 1 is shown in the figures, the aperture in the side plate 2 will be a mirror image).

The endstop 29 of the material 8 in the fourth embodiment has two plates of material 30 rivetted to the two faces of the material 8 to provide an endstop section close the end of the material 8. The plates 30 extend beyond the material 8 in a lateral direction so that each of the plates 30 provides a projection 31 which extends into one of the apertures 23.

Unlike the arrangement of the second embodiment, the projections 31 into the apertures 23 are intended only to provide an endstop and not to provide any guiding or locating function to control the position of the spiral 15, in this embodiment the location of the spiral 15 is controlled by the side plate 22. Accordingly, the apertures 23 are sized and shaped so that they do not constrain movement of the coil 15 as the material 8 is deployed from the housing.

When the material 8 has fully deployed from the housing the endstop 29 will move until the projections 31 contact the edges of the apertures 23 and the endstop 29 will then stop further deployment of the material 8 from the housing 1. The use of rivetted plates 30 to provide the endstop 29 means that the endstop 29 is significantly thicker than the bulk of the material 8 and this arrangement is preferred because it allows a back-up backstop arrangement to be provided for safety by the endstop 29 being trapped between the pins 5 and 6 similarly to the arrangement of the first embodiment.

In the fourth embodiment an additional pin 46 is provided adjacent to the pin 6. The pin 46 connects the side plates 1 and 2 adjacent to the pins 5 and 6 and helps to reinforce and stabilise the housing structure in this region to ensure that the loads on the pins 5 and 6 can be transferred into the side plates 1 and 2. Further, the pin 46 is arranged so that the material 8 passes between the pins 6 and 46. Thus, the additional pin 46 can assist in stabilising and controlling the degree of bending of the material 8 so that the extension force can be held constant. Further, trapping of the thickened endstop 29 between the pins 6 and 46 provides a further back-up endstop arrangement for additional safety. Note that the provision of the pin 46 is not essential for the arrangement of the fourth embodiment. A pin similar to the pin 46 could be provided in any of the other embodiments if desired.

Figure 10:
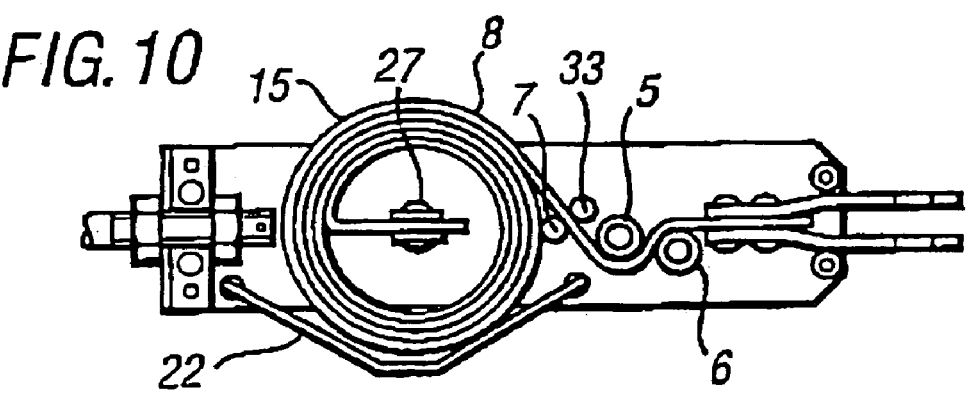
FIG. 10 shows a side view of an embodiment of the invention ready for deployment.
Figure 11:
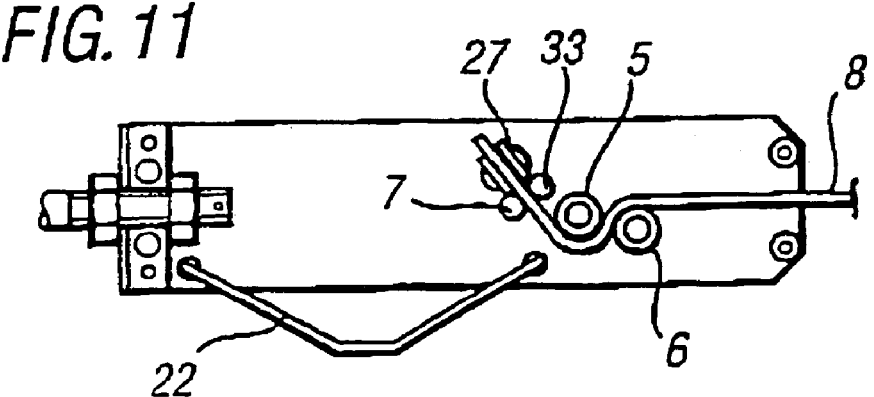
FIG. 11 shows a side view of the embodiment of FIG. 10 after deployment.

A fifth embodiment of the invention is shown in FIGS. 10 and 11 in side elevation with the material 8 ready to be deployed in FIG. 10 and the material 8 fully deployed from the housing in FIG. 11.

The fifth embodiment is similar to the third embodiment with the addition of an extra pin 33 opposed to the pin 7.

When the material 8 is fully deployed the pins 7 and 33 will prevent further movement of the material 8 by trapping the thickened endstop 27 between them. In this case the pins 5 and 6 will act as a back-up endstop arrangement for safety, trapping the thickened endstop 27 between them if the pins 7 or 33 should fail.

In addition to trapping the endstop 27 the pin 33 cooperates with the pin 7 to control the movement of the material 8 as it moves towards the pins 5 and 6, further ensuring a constant tension force during deployment of the material 8. This prevents excessive movement of the material 8 which could cause the deployment tension on the material 8 to change. Such prevention of excessive movement of the material 8 is particularly important when the material 8 is undergoing heavy acceleration, for example during a fall arrest event.

This endstop arrangement is preferred because the bending of material 8 around the pin 5 downstream of the endstop absorbs some of the load along the material 8, making it easier for the endstop to support loads on the material 8 after the material 8 has deployed.

Figure 21:
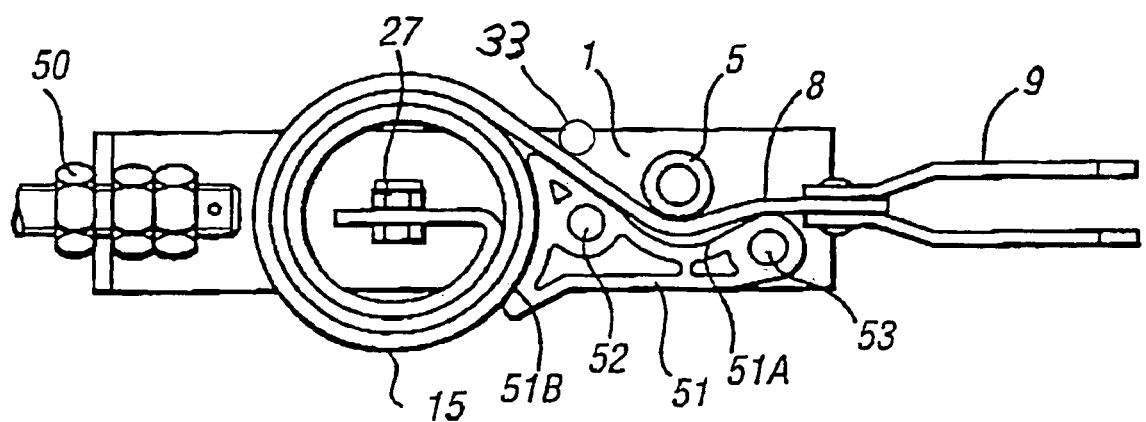
FIG. 21 shows a side view of an eleventh embodiment of ready for deployment.

An additional pin 33 could similarly be provided in the energy absorbers according to the other embodiments if desired, see for example FIG. 21.

Figure 12:
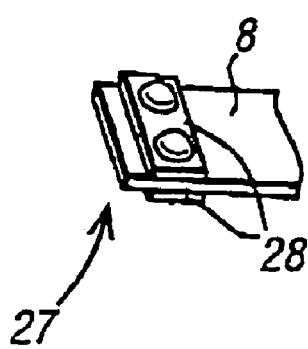
FIG. 12 shows a perspective view of a first endstop structure suitable for use in the embodiment of FIG. 1.

In FIG. 12 the endstop 27 used in the first, second, third and fifth embodiments is shown in more detail.

Figure 13:
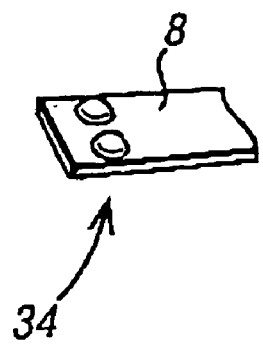
FIG. 13 shows a perspective view of a second endstop structure suitable for use in the embodiment of FIG. 1.

An alternative arrangement for endstop 34 which could be used in place of the endstop 27 is shown in FIG. 13. The endstop 34 is formed by a thickening provided by rivets near the end of the material 8.

Figure 14:
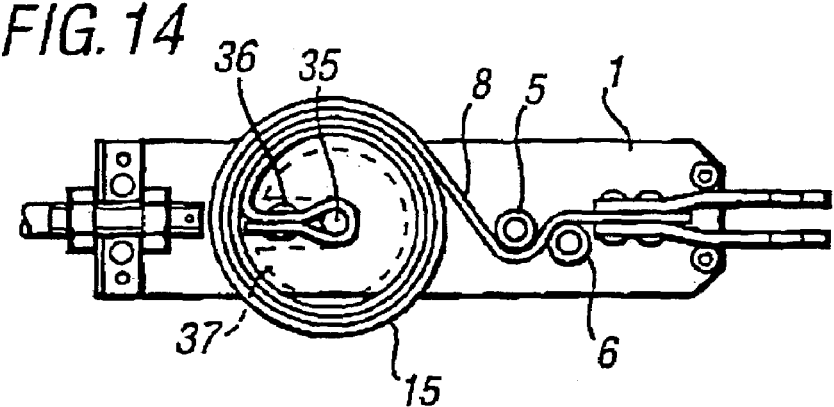
FIG. 14 shows a side view of a sixth embodiment ready for deployment.
Figure 15:
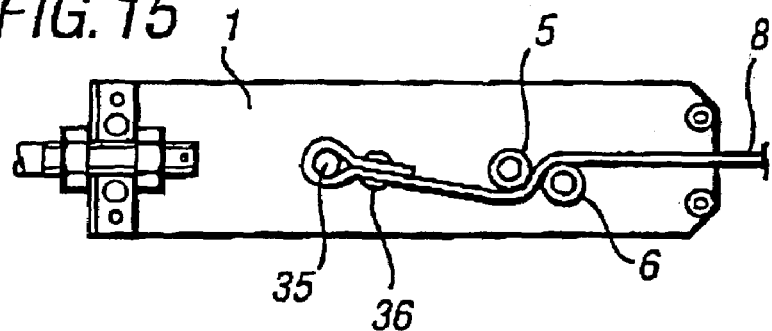
FIG. 15 shows a side view of the embodiment of FIG. 14 after deployment.

A sixth embodiment of the invention is shown in side view in FIGS. 14 and 15, where FIG. 14 shows the energy absorber ready for deployment and FIG. 15 shows the energy absorber with the material 8 fully deployed.

In the sixth embodiment of the invention a spindle 35 is held between the side plates 1 and 2 and an endstop 36 is provided by an end of the material 8 being passed around the spindle 35 to be doubled back on itself and the doubled over section then being rivetted together. As the material 8 is deployed the spiral 15 rotates around the spindle 35. Because the movement of the coil 15 is constrained by the spindle 35 there is no requirement for the pin 7.

Optionally, a shaped insert 37 can be located around the spindle 35 to provide a core to the spiral 15 to prevent the spiral 15 deforming during deployment of the material 8. The optional shaped insert 37 is shown by dashed lines in FIG. 12 only.

The arrangement of the sixth embodiment is expected to be more likely to suffer from changes in tension during deployment due to the change in the radius of the spiral as the material 8 is deployed than the other embodiments. This is because the entry angle of the material 8 to the pin 5 will change. This can be understood by review of FIGS. 14 and 15.

Figure 16:
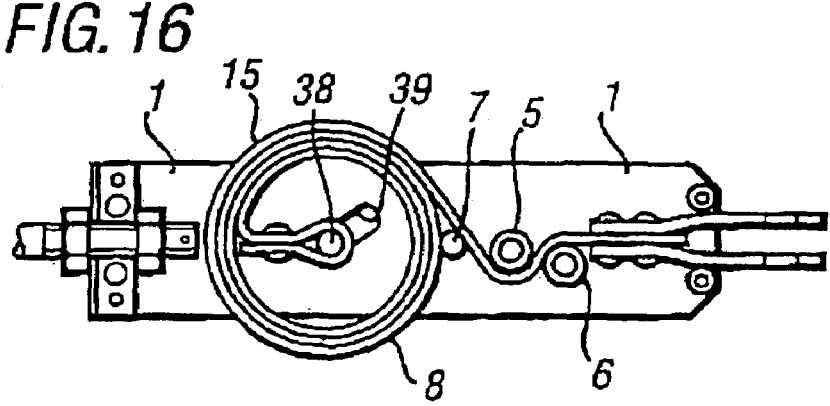
FIG. 16 shows a side view of a seventh embodiment ready for deployment.
Figure 17:
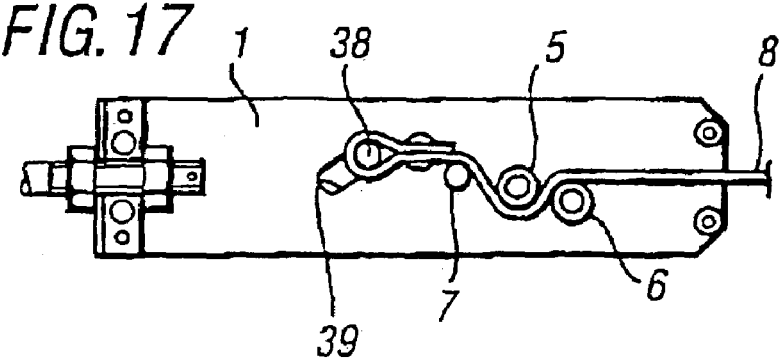
FIG. 17 shows a side view of the embodiment of FIG. 16 after deployment.

A seventh embodiment is shown in side plan view in FIGS. 16 and 17 with the energy absorber ready for deployment in FIG. 16 and the material 8 fully deployed in FIG. 17.

The seventh embodiment has the spiral 15 formed around a central spindle 38 with an endstop 36 similar to that in the fifth embodiment but instead of having a fixed spindle 35 the spindle 38 is arranged to be allowed to move in slots 39 formed in the side plates 1 and 2.

The slots 39 constrain the movement of the spindle 38 more closely than in the earlier embodiments employing apertures in the side plates. The spindle 38 prevents the coil 15 overriding the pin 7 while the slot 39 allows sufficient movement of the coil 15 perpendicular to the direction in which the material 8 is removed from the spiral 15 for the spiral 15 to float to minimise changes in the geometry and degree of bending applied to the material 8 as the radius of the spiral 15 changes and so keep the deployment tension as stable as possible.

A shaped spacer 37 could be used in the seventh embodiment similarly to the sixth embodiment.

In all of the embodiments described above the coil and pins are arranged essentially linearly within the housing. Other arrangements are of course possible. An eighth embodiment is shown in FIG. 18, which shows a plan view of an energy absorber ready for deployment. The eighth embodiment operates similarly to the seventh embodiment, the main change being the displacement of the spiral 15, spindle 38 and slots 39 laterally relative to the rest of the absorber structure. This increases the width of the energy absorber while decreasing its length in the un-deployed state and increases the degree of bending applied to the material 8 as it passes around the pin 5.

In the eighth embodiment an optional additional pin 24 as shown in the fourth embodiment is used.

The doubled over and rivetted end structure 36 shown in the fifth, sixth and seventh embodiments to attach the material 8 to the spindle is a simple and convenient arrangement but the person skilled in the art will realise that there are a very large number of other ways of attaching an elongate member to a spindle.

In all of the described embodiments the member 8 is shown as a single layer of elongate strip material having a constant cross-section. This is a preferred arrangement but it will be realised that other forms of material 8 such as rod or bar forms could be used to form the spiral 15. Further, although the use of a strip of material 8 having a constant cross-section is preferred for simplicity and to allow maximum energy absorption, the use of a varying cross-section may be desirable under some circumstances such as to provide a lead in portion having a lower deployment tension.

It would of course be possible to replace the single strip of material 8 with multiple layers of strip material. In particular, the material 8 could be formed by a continuous strip doubled over so that the material 8 as deployed and as formed into the spiral 15 is formed as a double layer, the strip being folded around a spindle to provide an endstop.

The pins 5 and 6 in the embodiments depicted in the figures could each be the same or differing shapes. For example, they could be round in cross-section, or some other shape, or they could be integrally incorporated in some other structure having the functionally of plates 1 and 2 and one or more pins. There could be more than two constraining pins to provide further constraining non-linearity if required in order to increase the force resisting the movement of material.

The pins 5 and 6 and also the pin 7 and any optional additional pins provided can be rollers arranged to rotate about axis that are substantially fixed relative to plates 1 and 2 in order to reduce friction when the material 8 is deployed. The friction when the material 8 is deployed can also be reduced by providing suitable coatings on the material 8 and/or the pins. Alternatively, the material 8 and/or pins may be coated in insulating material or plated with a sacrificial material to assist with lubrication and/or provide heat insulation.

The reduction of friction between the material 8 and the pins, and where appropriate any spindles, is advantageous for a number of reasons.

Firstly, when the energy absorber is operating and the material 8 is deploying, the absorbed energy is transformed into heat. When the energy is absorbed by plastic deformation of the material 8 this heat energy is dispersed throughout the volume of the material 8. However, where the energy is absorbed by friction the heat energy is concentrated at the points of contact between the material 8 and the pins. As a result, it will generally be the case that the greater the friction between the material 8 and the pins, the higher the proportion of the absorbed energy will be absorbed by frictional heating and the greater the temperatures reached at the contact points between the material 8 and the pins will be. If the heating at the contact points is sufficiently great contact welding may occur between the material 8 and the pins resulting in undesirable spikes in the deployment tension and possibly in failure of the energy absorber.

Another advantage of minimising the friction between the material 8 and the pins is that in general the deployment tension produced by deformation of the material 8 will be more accurately predictable than the tension produced by friction. This is particularly the case where the energy absorber is used in fall arrest equipment where it is a common requirement for the energy absorber to be in place for many years before operation. Changes in the frictional interaction of the material 8 and the pins due to environmental effects over time are less predictable and generally greater than changes in the loading produced by deformation of the material 8. As a result, for long term reliability it is advantageous to generate as much of the deployment tension as possible by deformation of the material 8 and to minimise friction.

The path of movement of the length of material constrained by abutments such as pins 5 and 6 could be any non-linear path. The length of material 8 could be any cross section and also such cross section could vary along the length of the material particularly in circumstances in which it is desirable to vary the tension required to deploy such material from its stored condition.

An alternative arrangement to the above described embodiments would be a double ended arrangement. This would comprise a housing having a end of the material 8 projecting from each end for attachment to a rigid support or cable. The spiral 15 can be formed by the material 8 spiralling inwards, then being folded over and spiralling back out again. Each end of the material 8 could then be deployed out of this double spiral through a separate pin arrangement as used in one of the embodiments described above.

In all of the described embodiments the pins are fixed and the deployment tension is set by the dimensions and physical properties of the material 8 and the degree of bending applied to the material 8 around the pins 5 and 6, and possibly 7, and it will be understood that energy absorbers having different deployment tensions can be provided by changing the dimensions of the material 8 and the amount of bending applied by the pins.

An energy absorber having a variable deployment tension could be produced by providing a suitable mechanism, for example a screw mechanism, to allow the position of one or more of the pins to be adjusted.

A ninth embodiment providing such an adjustable system is shown in FIG. 19.

The adjustable energy absorber of the ninth embodiment is based upon the energy absorber of the first embodiment shown in FIGS. 1 and 2.

In the ninth embodiment the pin 5 is mounted on a slide 40 which can be moved by a mechanism, not shown, in the direction of the arrows 41 and 42 parallel to the direction of deployment of the material 8 out of the coil 15 towards the pin 5.

As the slide 40 is moved, the position of the pin 5 relative to the pin 6 will be altered so that the degree of bending around the pins 5 and 6 at points 16 and 17 will also be altered, changing the deployment tension and amount of energy absorbed by the energy absorber.

The additional pin 33 as shown in FIGS. 10 and 11 is used to keep the material 8 moving past the splitter pin 7 in a stable position regardless of the movement of the pin 5. Thus, the pin 33 assists in keeping the entry angle of the material 8 to the pin 5 constant regardless of the position of the pin 5, enabling the deployment tension to be accurately predicted and kept constant during deployment.

It will be appreciated that other directions of movement of the pin 5 could be used instead of the directions of the arrows 41 and 42 to change the deployment tension. However, movement parallel to the direction of deployment in the material 8 out of the coil 15 towards the pin 5 is preferred because this minimises the amount of geometrical change in the energy absorber as the pin 5 is moved and so simplifies the task of ensuring that movement of the pin 5 produces a predictable and consistent change in the deployment tension and that the resulting deployment tension is constant during deployment.

In the arrangement shown in FIG. 19 where pins 5, 6 and 7 are employed it is preferred to have the central pin 5 moveable to minimise the changes in the geometry at which the material 8 enters and leaves the pin arrangement when the moveable pin is moved, in order to simplify matters. If the endstop arrangement is provided by a thickened endstop being trapped between the pins 7 and 33, as shown in FIG. 19, it will not normally be possible to ensure that the moveable pin 5 and pin 6 will be able to act as a back-up endstop arrangement unless the possible range of movement of the moveable pin is constrained.

Figure 20:
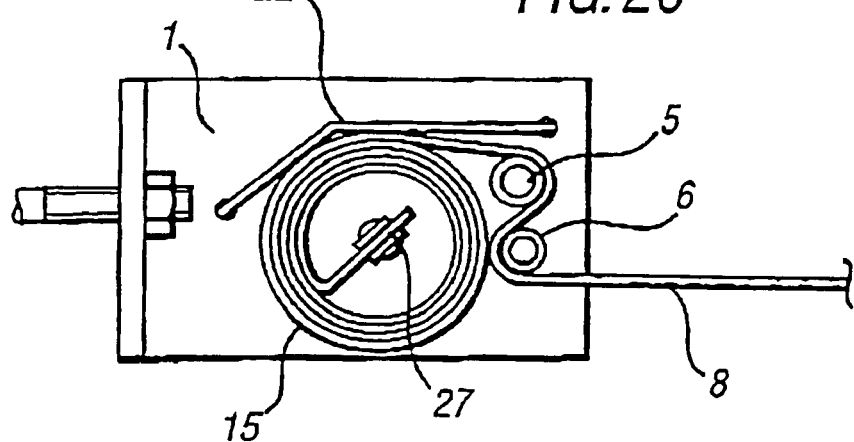
FIG. 20 shows a side view of the tenth embodiment ready for deployment.

A tenth embodiment of the invention is shown in FIG. 20 in which the pins 5 and 6 are spaced apart perpendicular to the deployment direction of the material 8 rather than parallel to the deployment direction of the material 8.

In this case, no pin 7 is required, the movement of the coil 15 being controlled by a side plate 22 and by contact between the coil 15 and the material 8 passing around the pin 6. In this arrangement, where the coil 15 contacts the material 8 passing around the pin 6 the coil 15 and the material 8 are moving in the same direction, minimising friction.

An eleventh embodiment of the invention is shown in FIG. 21 in which the pin 6, pin 7 and side plate 22 are replaced by a single guide element 51.

In the eleventh embodiment the energy absorber comprises a housing formed by plates 1 and 2 (plate 1 only is shown in FIG. 21). Fixing means 50 are provided at one end of the plates for attaching them to a rigid anchor or wire or rope termination. A length of material 8 of strip material is formed into a coil 15 and provided with attachment means 9 at one end for attachment to a rigid anchor or wire or rope termination and with an endstop 27 at the other end. The material 8 being located within the housing as before. As previously mentioned in connection with the embodiment of FIGS. 10 and 11, the additional pin 33 is also provided on the housing spaced from the guide element 51. The additional pin 33 and the guide element 51 of this embodiment, like the pins 7 and 33 of the embodiment of FIGS. 10 and 11, are contacted by the endstop 27 of the coil to limit the extent of movement of the attachments away from each other.

In the eleventh embodiment the length of material 8 passes between pin 5 and a guide element 51. The guide element 51 has a curved guide surface 51a opposed to the pin 5 which controls the degree of bending of the material 8 as the material 8 is deployed and ensures that the material 8 is bent first in one direction around the pin 5 and then in a reverse direction in order to maximise the amount of energy absorbed.

The guide element 51 also has a curved restraining surface 51b located so that when the material 8 deploys the outer surface of the coil 15 is urged into contact with the restraining surface 51b. The curved retaining surface 51b controls the position of the coil 15 and prevents it moving towards the pin 5 or sideways similarly to the side plate 22 of the third embodiment.

Thus, the guide element 51 acts to split the material 8 away from the coil as it deploys and controls the entry angle of material 8 to the pin 5 and guide surface 51a, thus ensuring that the deployment force remains constant. Further, the guide element 51 controls the degree of deformation of the material 8 with the guide surface 51a. Finally, the guide 4 element 51 prevents sideways movement of the coil as the material 8 deploys. Accordingly, the guide element 51 replaces the pin 6, side plate 22 and pin 7 of the previous embodiments.

The guide member 51 is retained between the side plates 1 and 2 by being mounted on two fixed pins 52 and 53 attached to the side plates 1 and 2.

The endstop 27 is a nut and bolt passing through a hole in the end of the strip of material 8 sized so that the nut and bolt cannot pass between the pin 5 and the guide surface 51a of the guide element 51.

As in the previous embodiments the endstop 27 is sufficiently strong that after the deployment of the material 8 from the housing has been stopped by the endstop 27 the energy absorber will still be able to support twice the peak tension force encountered during deployment.

Figure 22:
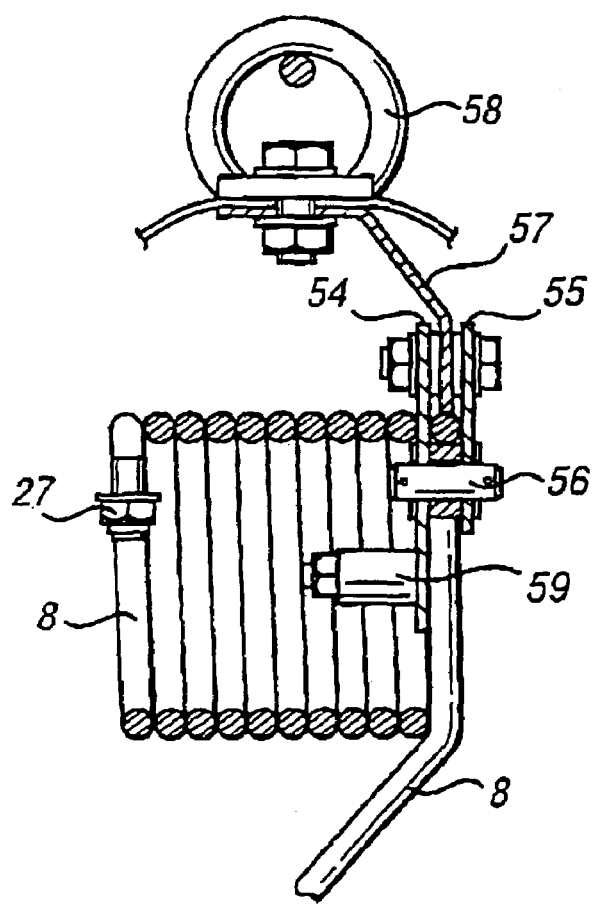
FIG. 22 shows a first side view of a twelfth embodiment employing a helical coil ready for deployment.
Figure 23:
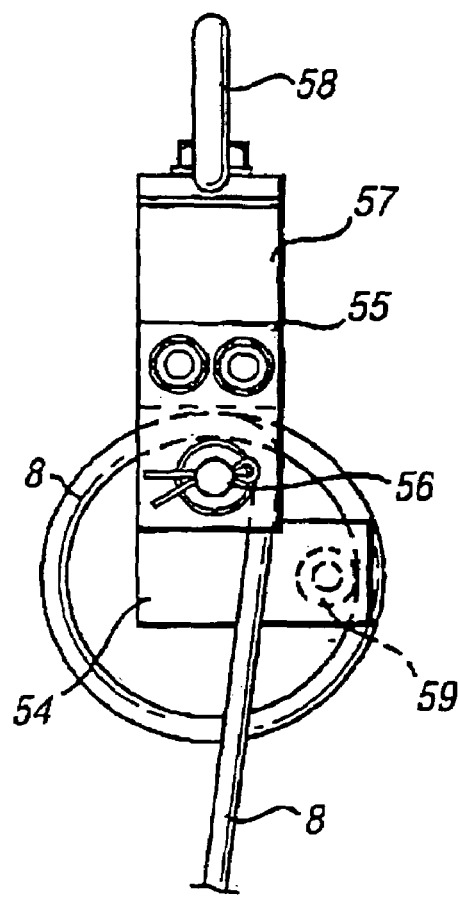
FIG. 23 shows a second side view of the embodiment of FIG. 22.
Figure 24:
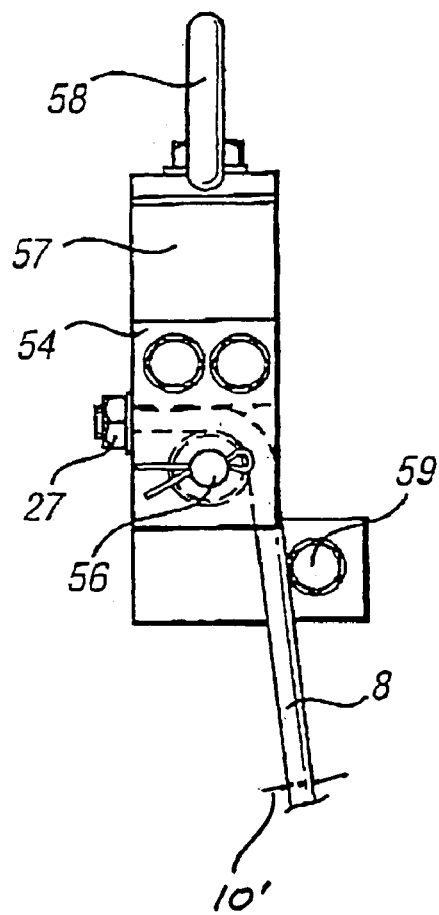
FIG. 24 shows a detail view of the endstop of FIG. 22 after deployment.

A twelfth embodiment of the invention is shown in FIGS. 22 to 24.

In this case the energy absorber structure does not employ side plates. A length of material 8 which in this case is a rod material is wound into a helical coil. The free end of the length of material 8 is provided with attachment means for attaching to a rigid anchor or rope or wire termination and has an endstop 27 at the other end to prevent the material 8 being separated from the rest of the energy absorber. In the figures this attachment means are not shown.

The material 8 passes between a pair of spaced apart parallel side plates 54 and 55 which define a channel between them through which the material 8 can pass and the side plates 54 and 55 also have a pin 56 mounted between them.

A fixing means for attaching the side plates 54 and 55 to a rigid anchor or wire or rope termination is provided by a further plate 57 which links the side plates 54 and 55 to a load ring 58 which can be attached to a rigid anchor or to a wire or rope.

When the energy absorber is required to absorb energy an increase in tension force is applied to the load ring 58 and to the material 8 until the applied force becomes sufficiently high to pull the material 8 around the pin 56 such that the absorber extends and is plastically deformed to absorb energy. A guide pin 59 projects from the side plate 54 into the interior of the helical coil. The guide pin 59 is in contact with the inner surface of the coil on the opposite side of the pin 56 to the entry direction of the material 8 when pulling of the material 8 over the pin 56 occurs so that the guide pin 59 counteracts and resists the tendency for the axis of the helical coil to move relative to the pin 56 and therefore ensures a constant degree of yielding of the deployed material 8 so that the deployment force remains constant.

The endstop 27 is formed by a nut tightened onto a threaded end section of the material 8. However, the nut could be replaced by a thickened end section of the material 8. The nut 27 is too large to fit between the side plates 54 and 55 so that when the nut 27 contacts the side plates 54 and 55 deployment of the material 8 is stopped.

In the illustrated embodiment the plate 57 projects between the side plates 54 and 55 to define a narrow channel between the end of the plate 57 and the pin 56 so that the endstop 27 cannot pass between the pin 56 and the end of the plate 57. This provides a secondary back-up endstop for the energy absorber.

The endstop arrangement is shown in the condition where the endstop has stopped deployment of the material 8 by coming into contact with the side plates 54 and 55 in more detail in FIG. 24.

Similarly to previous embodiments the endstop 27 is arranged so that when the endstops have stopped deployment of the material 8 the energy absorber is able to support double the peak deployment load.

Figure 25:
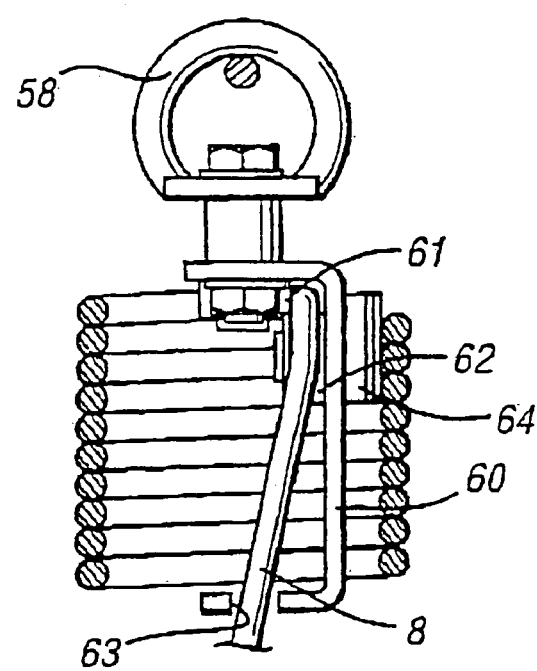
FIG. 25 shows a side view of a thirteenth embodiment employing a helical coil ready for deployment.
Figure 26:
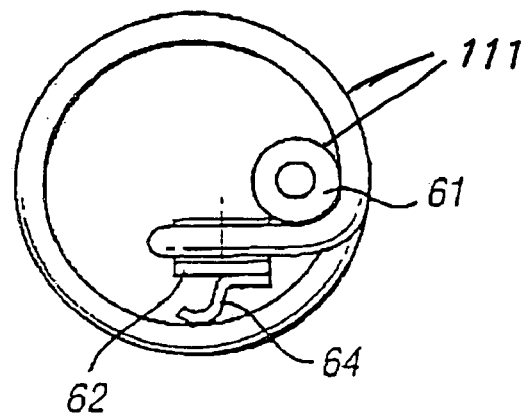
FIG. 26 shows an end view of the embodiment of FIG. 25.

A thirteenth embodiment of the invention is shown in FIGS. 25 and 26.

The thirteenth embodiment of the invention is similar to the twelfth embodiment of the invention in that the material 8 is a rod material formed into a helical coil. However in the thirteenth embodiment the helical coil is arranged with the coil axis substantially parallel to the direction of the applied force causing the material 8 to deploy whereas in the twelfth embodiment the coil axis was perpendicular to the applied force direction.

In the thirteenth embodiment the energy absorber comprises a substantially U-shaped plate 60 on which a pair of pins or rollers 61 and 62 are mounted. The pins 61 and 62 are mounted on perpendicular faces of the U-shaped plate 60 so that the axes of the pins 61 and 62 are perpendicular.

The plate 60 is linked to fixing means provided by a load eye 58 for connection to a rigid anchor or wire or rope termination similarly to the twelfth embodiment while the free end of the deployable material 8 is provided with an attachment means, not shown, for attachment to a rigid anchor or wire or rope termination and has an endstop, not shown, at the other end to prevent the deployable material 8 being separated from the rest of the energy absorber.

When the energy absorber is required to absorb energy an increase in tension force is applied between the load eye 58 and the free end of the deployable material 8 until the applied force becomes sufficiently high to pull material 8 around pins 61 and 62 so that the absorber extends to absorb energy. The deployable material 8 is first bent around the pin 61 which has an axis substantially parallel to the axis of the helical coil and is subsequently bent in a second direction perpendicular to the first about the pin 62 having an axis perpendicular to the axis of the pin 61 and the helical coil. The material 8 then passes through an aperture 63 in the U-shaped plate 60.

A guide element 64 projects from the U-shaped plate 60 and bears on the inner surface of the helical coil. Similarly to the pin 59 of the twelfth embodiment the guide element 63 prevents movement of the hellcat coil relative to the pin 61.

Similarly to the twelfth embodiment the endstop can be formed by a nut screwed onto a threaded end of the deployable material 8 or a thickened end portion. The size of the endstop is such that the endstop cannot pass through the channel defined between the pins 61 and 62 and the adjacent surfaces of the U-shaped plate 60. Further, the endstop is preferably sized so that it cannot fit through the aperture 63 so the aperture 63 can form a back-up endstop.

The endstop must be sufficiently strong to retain the material 8 attached to the energy absorber under a load at least double the deployment tension force after full deployment of the material 8.

Figure 27:
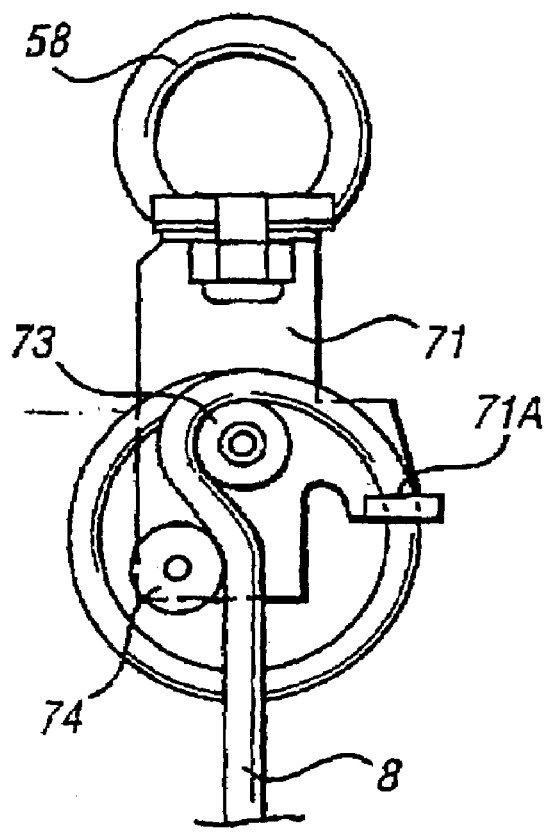
FIG. 27 shows a side view of a fourteenth embodiment employing a helical coil.
Figure 28:
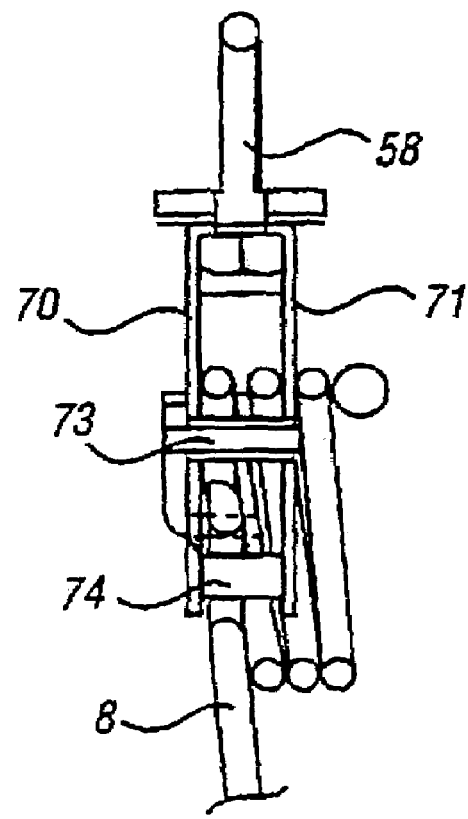
FIG. 28 shows a second side view of the embodiment of FIG. 27.

A fifteenth embodiment of the invention is shown in FIGS. 27 and 28.

The fifteenth embodiment is similar to the thirteenth embodiment in that the deployable material 8 is a rod material arranged in a helical coil. The energy absorber has a structure comprising a body formed by a pair of parallel spaced apart side plates 70 and 71 with a pair of parallel pins 73 and 74 located between them. Similarly to the thirteenth embodiment the plates 70 and 71 are connected to a load eye 58 for attachment to a rigid anchor wire or rope termination. The length of material 8 is provided with attachment means, not shown, at one end for attaching to a rigid anchor or wire rope termination and with an endstop at the other end of the material 8 being separated from the main body.

When the energy absorber is required to absorb energy an increase in tension force is applied between the load eye 58 and the material 8 until the applied force becomes sufficiently high to pull the material 8 around pins 73 and 74 such that the absorber extends to absorb energy. The material 8 passes first around the pin 73 which bends the material 8 in a first direction and then around the pin 74 which bends the material 8 in the opposite direction, so maximising the amount of energy absorbed.

The pins 73 and 74 have axes parallel to the axis of the helical coil of deployable material 8.

In order to prevent movement of the helical coil relative to the pins 73 and 74 an extension of the plate 71 is provided with an aperture 71*a* through which the deployable material passes before reaching pins 73 and 74.

An endstop is provided by a nut screwed onto a threaded end section of the deployable material 8 or by an increased diameter end portion of the deployable material 8 with the endstop portion being too large to pass through the aperture 71*a*.

As before, the endstop arrangement must be sufficiently robust that after deployment of the material 8 has been stopped by the endstop the energy absorber is able to support a load at least double the deployment load.

If it is desired to keep the deployment tension of the energy absorber constant but to change the total amount of energy absorbed or limit the maximum links of the energy absorber after deployment to a particular value the length of the material 8 can be varied accordingly.

In most of the described embodiments, two pins 5 and 6 are used to carry out bending of the material 8 in a first sense and then back in the opposite sense and to absorb energy with a further pin 7 being used to separate the material 8 from the coil. In the described embodiments the pin 7 and any additional optional pins employed are not intended to carry out a significant amount of the bending of the material 8. It would of course be possible to employ more pins to bend the material 8 further if desired. However, it is preferred to only bend the material 8 once in each sense in order to avoid repeated bending and re-bending of the material 8 which could weaken the structure of material 8 and prevent the material 8 reliably supporting twice the deployment tension.

It has been found that it is particularly useful to form the material 8 from stainless steel, particularly stainless steel 316.

Where the energy absorber is to be employed in a fall arrest system and the material 8 is a strip it has been found that the stainless steel strip should have a thickness of at least 2 mm and a width of at least 30 mm. If a strip having smaller dimensions is used it has been found to be difficult to securely attach the end of the material 8 to a rigid anchor or cable or to provide a reliable endstop.

It is preferred that the diameter of the inner surface of the spiral coil 15 be-at least 40 mm. If the spiral coil is coiled down to a smaller inner radius, the changes in geometry as the material deploys may cause changes in the deployment tension.

Figure 2A:
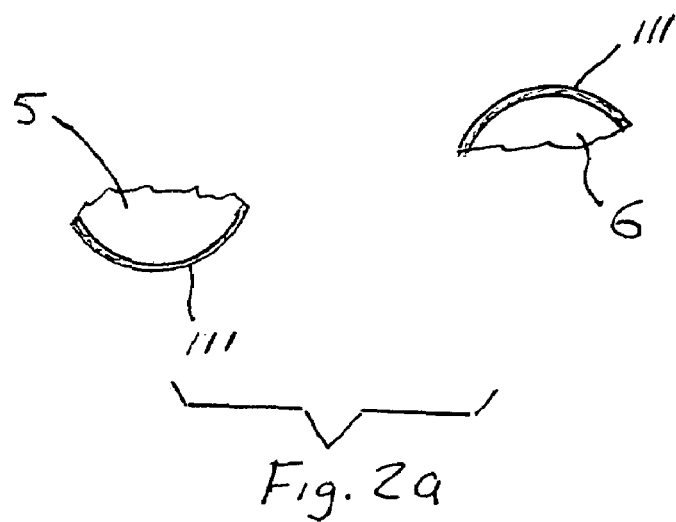
FIG. 2a is a partial view on an enlarged scale showing a friction reducing surface on pins of the energy absorber of the invention.

A wide range of materials can be used to provide the pins. However, it is preferred to employ stainless steel rollers as pins with the rollers or the deployable material having a friction reducing surface coating 111 (FIGS. 2, 2a and 26) of molybdenum disulphide or a similar material or a friction reducing layer such as silver plating or a similar metal plating layer. The one spaced pin 5 has a round outer surface that extends thereabout for 360°. In the embodiment of FIG. 2, the other spaced pin 6 has a round outer surface that also extends thereabout for 360°, while the embodiment of FIG. 21 has its other spaced pin 53 provided with a round outer surface defined by a guide element 51 and extending thereabout for less than 360°. The guide element 51 of the FIG. 21 embodiment is mounted on the housing 1 by the other spaced pin 51 and guide pin 52.

In many of the described embodiments a first pin 5 is used to bend the material 8 being deployed and the material 8 is then bent in the opposite direction by a second pin 6 to straighten it. This re-bending by the second pin 6 increases the amount of energy absorbed by the material 8 and so increases the amount of energy that can be absorbed by the energy absorber. The second pin 6 also helps to stabilise movement of the material 8 and so helps to keep the deployment tension constant during deployment. Finally, the pin 6 helps to hold the material 8 in place before deployment occurs.

Although lateral movement of the free end of the material 8 before deployment is not of any real consequence for the operation of the energy absorber, it has been found that in practice, particularly when the energy absorber is used in a fall arrest system, users can find easy or excessive lateral movement of the free end of the material 8 alarming.

Accordingly, although the use of the second pin 6 is not essential it is preferred in practice because it allows the energy absorber to absorb more energy and makes the energy absorber more acceptable to users.

It will be understood that in order to allow the energy absorber to absorb large quantities of energy it is necessary for the bending of a material 8 to be sufficient to cause plastic deformation of the material 8.

Where an energy absorber is to be used in a fall arrest system it is desirable, and in many countries a legal requirement, that when a fall arrest event occurs so that the energy absorber operates and the material 8 is deployed a clear visual signal that such deployment has occurred is provided.

Figure 29:
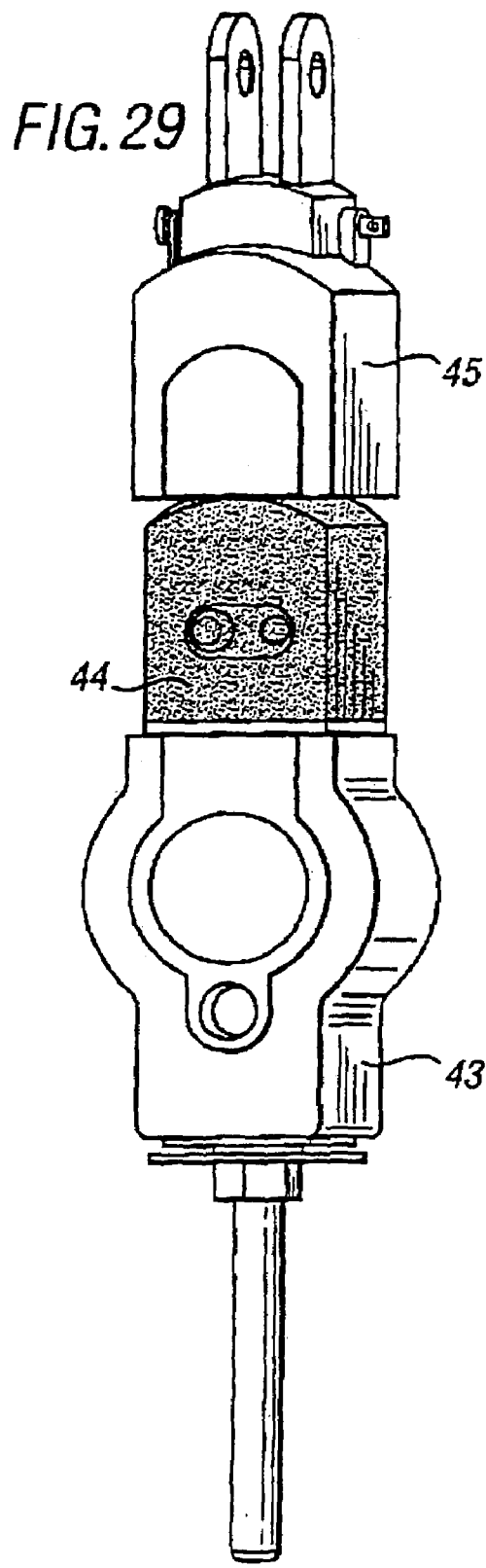
FIG. 29 shows a perspective view of an fifteenth embodiment ready for deployment.
Figure 30:
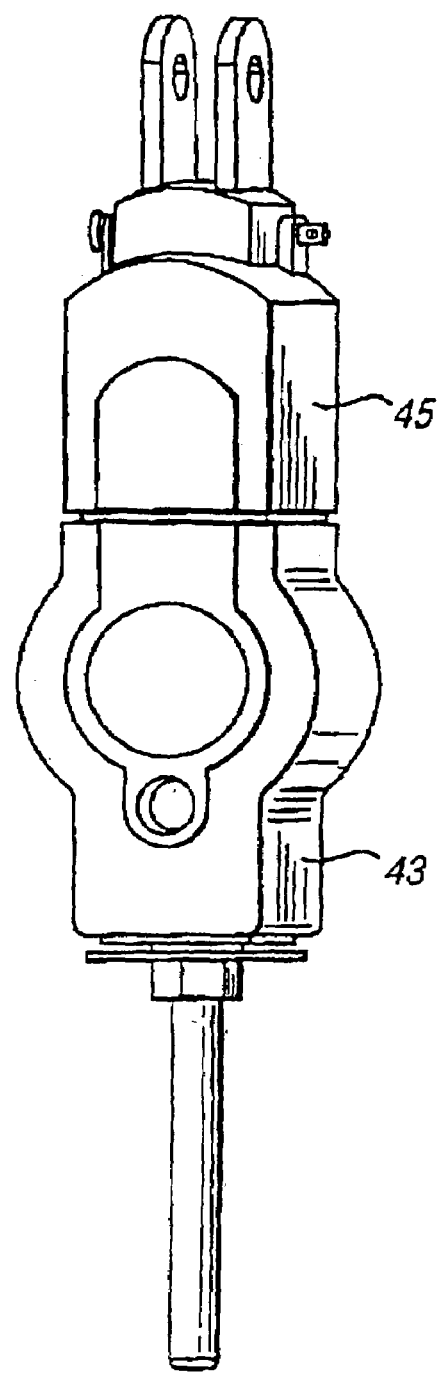
FIG. 30 shows the embodiment of FIG. 29 after deployment.

One method of providing such a visual indication of operation in any of the described embodiments or options is shown in FIGS. 29 and 30 in which FIG. 30 shows the energy absorber in its normal condition and FIG. 29 shows the energy absorber when the material 8 has been deployed.

The energy absorber is retained inside a weather proof housing 43 having a contrasting coloured section 44.

A shroud 45 is attached to the material 8 and is positioned so that normally the shroud 45 covers the contrasting coloured section 44 of the housing.

When the energy absorber has operated and the material 8 is deployed from the housing the shroud 45 is moved off the contrasting coloured section 44 so that it can be seen.

Thus, exposure of the contrasting coloured section 44 provides an unambiguous visual indication that the energy absorber has been operated. In a fall arrest system this indicates that a fall arrest event had occurred.

Typically, the normally visible parts of the housing 43 and shroud 45 would be black while the contrastingly coloured section 44 would be yellow, red or a metallic colour.

A reverse arrangement where the contrasting coloured portion is carried with the material 8 as it deploys so that the contrasting coloured portion is removed from a fixed shroud or cover to reveal it would also be possible.

Finally, the material 8 itself could be coloured to provide the visual indication when it was deployed. However, the use of a separate coloured portion to provide the visual indication is preferred.

Where an external housing is employed on the energy absorber, as shown in FIGS. 29 and 30, the housing can be used to replace the U-shaped plate 22 in limiting movement of the spiral coil 15, provided that the housing is strong enough and provided with a suitable internal profile.

As explained above, if the angle through which the deployed material 8 changes the required deployment force will also change. In fall arrest systems the maximum deployment load is set at a level which will not cause significant injury to a falling user and will not overstress other parts of the fall arrest system such as end anchors, intermediate anchors and cables and their supporting structures. Further, by arranging the deployment load to be constant and as close as possible to the maximum permitted load the rate at which energy is absorbed by the energy absorber can be maximised so that the duration and distance of a fall event can be reduced as far as possible. Accordingly, it will be understood that the deployment load must be as nearly constant as possible and that unpredictable variations in the deployment load must be avoided.

Accordingly, it is necessary to ensure that the entry angle at which the deployable material approaches the first pin, or other bending element, is kept as constant as possible and in the described embodiments various restraining and guiding arrangements for doing this are described.

Where a spiral coil is used it will be appreciated that if the axis of rotation of the spiral coil is fixed the entry angle to the bending or deforming elements of the energy absorber will inevitably alter as the material is deployed because the radius of the coil will change. Accordingly, where a spiral coil is used it is preferred that the coil be flee to float while the entry angle of the material to the material bending parts of the energy absorber is restrained so that the body of the coil can move laterally to allow the entry angle to remain constant as the radius of the spiral coil reduces.

In the embodiments above it is specified that the endstop is arranged such that the energy absorber is able to support a load of at least double the deployment load when deployment of the deployable material has been stopped by the endstop. It will be appreciated that in the embodiments described, the stopping point of the endstop is arranged upstream of the pins or elements used to bend the deployable material. As a result, it should be appreciated that because of the well known capstan effect the load actually applied to the endstop will be lower than the load acting on the energy absorber as a whole. As a result, although the energy absorber must be able to support at least double the deployment load it does not automatically follow that the endstop itself would be able to support double the deployment load if it was applied directly.

In the description the use of pins to control movement of and to bend the deployable material is described. It will be realised that as well as fixed or rotating pins or rollers being used the function of the pins could be replaced by suitably shaped fixed elements, particularly fixed elements formed of plastics material.

Although the invention has been particularly described above with reference to specific embodiments, it will be understood by persons skilled in the art that these are merely illustrative and that variations are possible without departing from the scope of the claims which follow.

What is claimed is:

1. An energy absorber comprising:
   a housing having an attachment for attaching the energy absorber to a first structure;
   a metallic coil mounted by the housing and having a pair of ends one of which includes an endstop;
   another attachment for attaching the other end of the metallic coil to a second structure;
   a first pair of pins mounted by the housing in a spaced relationship from each other along a direction between the attachments, the first pair of pins having round outer surfaces;
   the metallic coil extending to its other end around one of the spaced pins with a curvature in one direction and thence disengaging the one spaced pin and extending to and around the other spaced pin with a curvature in another direction opposite its one direction of curvature around the one pin;
   the metallic coil plastically deforming in opposite directions in a sequential manner around the first pair of spaced pins upon uncoiling under the impetus of force applied to the pair of attachments away from each other;
   a second pair of pins mounted by the housing in a spaced relationship from each other and being contacted by the metallic coil upon uncoiling upon movement thereof toward the first pair of pins around which the deformation sequentially takes place in opposite directions; and
   upon uncoiling of the metallic coil, the second pair of pins are being contacted by the endstop to limit the extent of movement of the attachments away from each other.

2. An energy absorber as in claim 1 wherein the metallic coil has a spiraling construction with a cross-sectional shape selected from the group consisting of rectangular, round, tubular or a combination thereof.

3. An energy absorber as in claim 1 wherein the shape of the coil is formed from a strip having a cross-section that varies along its length.

4. An energy absorber as in claim 1 wherein each of the first pair of pins includes a roller.

5. An energy absorber as in claim 1 wherein the metallic coil in made of stainless steel.

6. An energy absorber as in claim 1 wherein the metallic coil has a friction reducing coating.

7. An energy absorber as in claim 1 which includes a visual indicator when the metallic coil has been deployed by uncoiling.

8. An energy absorber as in claim 1 wherein said one spaced pin of the first pair of pins has a round surface that extends thereabout for 360 degrees.

9. An energy absorber comprising:
   a housing having an attachment for attaching the energy absorber to a first structure;
   a metallic coil mounted by the housing and having a pair of ends one of which includes an endstop;
   another attachment for attaching the other end of the metallic coil to a second structure;
   a first pin mounted by the housing and having a round surface;
   a guide element mounted by the housing and having a round surface spaced from the first pin along a direction between the attachments;
   the metallic coil extending to its other end around the first pin with a curvature in one direction and thence disengaging the first pin and extending to and around the round surface of the guide element with a curvature in another direction opposite its one direction of curvature around the first pin;
   the metallic coil plastically deforming in opposite directions in a sequential manner around the first pin and the round surface of the guide element upon uncoiling under the impetus of force applied to the pair of attachments away from each other; and
   a second pin spaced from the guide element, upon uncoiling of the metallic coil, the second pin and the guide element are being contacted by the endstop to limit the extent of movement of the attachments away from each other.

10. An energy absorber as in claim 9 wherein the metallic coil has a spiraling construction with a cross-sectional shape selected from the group consisting of rectangular, round, tubular or a combination thereof.

11. An energy absorber as in claim 10 wherein the first pin includes a roller.

12. An energy absorber as in claim 10 wherein the metallic coil in made of stainless steel.

13. An energy absorber as in claim 10 wherein the metallic coil has a friction reducing coating.

14. An energy absorber as in claim 10 which includes a visual indicator when the metallic coil has been deployed by uncoiling.

15. An energy absorber as in claim 10 wherein the first pin has a round surface that extends thereabout for 360 degrees.

16. An energy absorber as in claim 9 wherein the shape of the coil is formed from a strip having a cross-section that varies along its length.

* * * * *

UNITED STATES PATENT AND TRADEMARK OFFICE
CERTIFICATE OF CORRECTION

| | | |
|---|---|---|
| PATENT NO. | : 7,188,704 B2 | Page 1 of 1 |
| APPLICATION NO. | : 11/155234 | |
| DATED | : March 13, 2007 | |
| INVENTOR(S) | : Julian E. Renton and Peter Nott | |

It is certified that error appears in the above-identified patent and that said Letters Patent is hereby corrected as shown below:

Column 17, Line 64, Claim 1, please delete "being".

Column 18, Line 44, Claim 9, please delete "being".

Signed and Sealed this

Nineteenth Day of June, 2007

JON W. DUDAS
*Director of the United States Patent and Trademark Office*